(12) United States Patent
Zhang et al.

(10) Patent No.: US 9,479,409 B2
(45) Date of Patent: Oct. 25, 2016

(54) PASSIVE REACHABILITY MEASUREMENT FOR INLINE SERVICE CHAINING

(71) Applicant: Telefonaktiebolaget L M Ericsson (publ), Stockholm (SE)

(72) Inventors: Ying Zhang, Fremont, CA (US); Joel Halpern, Leesburg, VA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 194 days.

(21) Appl. No.: 14/462,372

(22) Filed: Aug. 18, 2014

(65) Prior Publication Data

US 2016/0050131 A1 Feb. 18, 2016

(51) Int. Cl.
*H04L 12/26* (2006.01)
*H04L 12/24* (2006.01)
*H04L 12/721* (2013.01)
*H04L 12/703* (2013.01)

(52) U.S. Cl.
CPC ....... *H04L 43/0811* (2013.01); *H04L 41/0681* (2013.01); *H04L 41/0686* (2013.01); *H04L 41/12* (2013.01); *H04L 45/38* (2013.01); *H04L 45/28* (2013.01); *H04L 45/70* (2013.01)

(58) Field of Classification Search
CPC ............... H04L 43/0811; H04L 45/38; H04L 41/0681; H04L 41/0686; H04L 41/12
See application file for complete search history.

(56) References Cited

U.S. PATENT DOCUMENTS

| 8,817,625 | B1 | 8/2014 | Zhang et al. | |
| 9,038,151 | B1* | 5/2015 | Chua | H04L 45/02 709/223 |
| 9,264,400 | B1* | 2/2016 | Lin | H04L 63/0245 |
| 9,319,324 | B2 | 4/2016 | Beheshti-Zavareh et al. | |
| 2010/0080226 | A1* | 4/2010 | Khalid | H04L 41/5003 370/392 |
| 2013/0010600 | A1 | 1/2013 | Jocha et al. | |
| 2013/0272305 | A1 | 10/2013 | Lefebvre et al. | |
| 2014/0215074 | A1 | 7/2014 | Zhang et al. | |
| 2014/0310388 | A1* | 10/2014 | Djukic | H04L 41/0816 709/221 |
| 2015/0092564 | A1* | 4/2015 | Aldrin | H04L 41/5038 370/241.1 |
| 2015/0127805 | A1* | 5/2015 | Htay | H04L 43/0876 709/224 |
| 2015/0172186 | A1* | 6/2015 | Kizu | H04L 45/34 370/392 |

(Continued)

OTHER PUBLICATIONS

Ohta, et al., "Passive Packet Loss Monitoring that Em-ploys the Hash-Based Identification Tech-nique," 9th IFIP/IEEE International Symposium on Integrated Network Management, May 19, 2005, pp. 1-14.

(Continued)

*Primary Examiner* — Chi H Pham
*Assistant Examiner* — Shailendra Kumar
(74) *Attorney, Agent, or Firm* — Nicholson De Vos Webster & Elliott, LLP

(57) ABSTRACT

A method is implemented by a computing device in communication with a network having a plurality of switches. The method performs path correctness testing where the path defines a service chain associated with a flow of data. The method configures the plurality of switches using a flow control protocol. The method includes the steps of selecting a switch from the path to configure path correctness testing, sending a configuration request to the selected switch to instate at least one rule for testing path correctness, receiving copies of flow packets from at least one switch in the path, and comparing the copies of flow packets with a service chain configuration of the flow to confirm path correctness.

21 Claims, 11 Drawing Sheets

(56) References Cited

U.S. PATENT DOCUMENTS

2016/0080263 A1* 3/2016 Park ................... H04L 49/35
370/392
2016/0099853 A1* 4/2016 Nedeltchev ......... H04L 43/0888
370/253

OTHER PUBLICATIONS

Quinn, et al., "Network Service Header; draft-quinn-sfc-nsh-021xt," IETF Trust, Network Working Group Internet-Draft, Feb. 14, 2014, 21 pages.
OpenFlow 1.1 http://www.openflow.org/wk/index.php/OpenFlow_v1.1; 7 pages.
Joseph, D. A., et al., "A policy aware switching layer for data centers", Proc. ACM SIGCOMM, pp. 51-62; 2008.
McKeown, N., et al., "Openflow: enabling innovation in campus networks", SIGCOMM; Mar. 14, 2008; 6 pages.
Ali, Z., et al., "Node-IDS Based Resource Reservation Protocol (RSVP) Hello: A Clarification Statement", Network Working Group; RFC 4558; Jun. 2006; 7 pages.
Andersson, L., et al., "LDP Specification", Network Working Group; RFC 5036; Oct. 2007; 135 pages.
Awduche, D., et al., "RSVP-TE: Extensions to RSVP for LSP Tunnels,", Network Working Group; RFC 3209; Dec. 2001; 61 pages.
Babiarz, J., et al., "Configuration Guidelines for DiffServ Service Classes", Network Working Group; RFC 4594; Aug. 2006; 57 pages.
Baker, F., et al., "A Differentiated Services Code Point (DSCP) for Capacity-Admitted Traffic", Internet Engineering Task Force (IETF); RFC 5865; May 2010; 14 pages.
Baker, F., et al., "Management Information Base for the Differentiated Services Architecture", Network Working Group, Request for Comment: 3289, May 2002, 116 pages.
Berger, L., "Generalized Multi-Protocol Label Switching (GMPLS) Signaling Resource ReserVation Protocol-Traffic Engineering (RSVP-TE)", Network Working Group; RFC 3473; Jan. 2003; 42 pages.
Bernet, Y., et al., "An Informal Management Model for Diffserv Routers", Network Working Group; RFC 3290; May 2002; 56 pages.
Black, D., "Differentiated Services and Tunnels", Network Working Group; RFC 2983; Oct. 2000; 14 pages.
Black, D., et al., "Per Hop Behavior Identification Codes", Network Working Group; RFC 3140; Jun. 2001; 8 pages.
Blake, S., et al., "An Architecture for Differentiated Services", Network Working Group; RFC 2475; Dec. 1998; 36 pages.
Borman, D., et al., "IPv6 Jumbograms", Network Working Group, Request for Comments: 2675, Aug. 1999, 9 pages.
Braden, et al., "Resource ReserVation Protocol (RSVP)—Version 1 Functional Specification", Network Working Group, Request for Comments: 2205, (Sep. 1997), 112 pages.
Chan, K., et al., "Differentiated Services Quality of Service Policy Information Base", Network Working Group; RFC 3317; Mar. 2003; 96 pages.
Charny, A., et al., "Supplemental Information for the New Definition of the EF PHB (Expedited Forwarding Per-Hop Behavior)", Network Working Group; RFC 3247; Mar. 2002; 24 pages.
Coltun, R., et al., "OSPF for IPv6", Network Working Group, Request for Comment: 5340, Jul. 2008, 94 pages.
Davie, B., et al., "An Expedited Forwarding PHB (Per-Hop Behavior)", Network Working Group, Request for Comments: 3246, The Internet Society, (Mar. 2002), 16 pages.
Deering, S., et al., "Internet Protocol, Version 6 (IPv6) Specification", Network Working Group, Request for Comments: 2460, Dec. 1998, 39 pages.

Eggert, L., et al., "Unicast UDP Usage guidelines for Application Designers", Network Working Group; RFC 5405; Nov. 2008; 27 pages.
Fenner, B., et al., "Management Information Base for the User Datagram Protocol (UDP)", Network Working Group; RFC 4113; Jun. 2005; 19 pages.
Grossman, D., "New Terminology and Clarifications for Diffserv", Network Working Group; RFC 3260; Apr. 2002; 10 pages.
Heinanen, J., et al., "Assured Forwarding PHB Group", Network Working Group; RFC 2597; Jun. 1999; 11 pages.
Hendrick, C., "Routing Information Protocol", Network Working Group, Request for Comment:1058, Jun. 1988, 33 pages.
Hopps, C., "Analysis of an Equal-Cost Multi-Path Algorithm", Network Working Group, Request for Comments: 2992, The Internet Society, (Nov. 2000), 8 pages.
Housley, R., et al., "Using Advanced Encryption Standard (AES) CCM Mode with IPsec Encapsulating Security Payload (ESP)", Network Working Group; RFC 4309; Dec. 2005; 13 pages.
Information Sciences Institute, University of Southern C., "Transmission control protocol darpa internet program protocol specification", Sep. 1981, Request for Comments: 793, 91 pages.
Kent, S., et al., "Security Architecture for the Internet Protocol", Network Working Group; RFC 4301; Dec. 2005; 101 pages.
Kompella, K., et al., "Procedures for Modifying the Resource reSerVation Protocol (RSVP)", Network Working Group; RFC 3936; Oct. 2004; 7 pages.
Malkin, G., et al., "RIP Version 2", Network Working Group; RFC 2453; Nov. 1998; 39 pages.
Malkin, G., et al., "RIPng for IPv6", Network Working Group; RFC 2080; Jan. 1997; 19 pages.
Moy, J., "OSPF Version 2", Network Working Group, Request for Comments: 2328, Apr. 1998, 244 pages.
Nichols, K., et al., "Definition of Differentiated Services Per Domain Behaviors and Rules for their Specification," Apr. 2001, 24 pages, Network Working Group, Request for Comments: 3086, The Internet Society.
Nichols, K., et al., "Definition of the Differentiated Services Field (DS Field) in the IPv4 and IPv6 Headers", Network Working Group; RFC 2474; Dec. 1998; 20 pages.
Oran, David, "OSI ISIS Intradomain Routing Protocol", Network Working Group, Request for Comments: 1142, (Feb. 1990), 157 pages.
Polk, J., et al., "A Resource Reservation Protocol (RSVP) Extension for the Reduction of Bandwidth of a Reservation Flow", Network Working Group; RFC 4495; May 2006; 21 pages.
Postel, J., ""User Datagram Protocol",", Aug. 28, 1980, 3 pages, RFC 768.
Rekhter, Y., et al., "A Border Gateway Protocol 4 (BGP-4)", Network Working Group; RFC 4271; Jan. 2006; 104 pages.
Rosen, E., et al., "BGP/MPLS IP Virtual Private Networks (VPNs)", Network Working Group, Request for Comment: 4364, Feb. 2006, 47 pages.
Shenker, et al., "Specification of Guaranteed Quality of Service", Network Working Group, Request for Comments: 2212, (Sep. 1997), 20 pages.
Socolofsky, T., et al., "A TCP/IP Tutorial", Network Working Group; RFC 1180; Jan. 1991; 28 pages.
Thaler, et al., "Multipath Issues in Unicast and Multicast Next-Hop Selection", Network Working Group, Request for Comments: 2991, The Internet Society, (Nov. 2000), 9 pages.
Wroclawski, J., "Specification of the Controlled-Load Network Element Service", Network Working Group; RFC 2211; Sep. 1997; 19 pages.
Wroclawski, J., "The Use of RSVP with IETF Integrated Services", Network Working Group; RFC 2210; Sep. 1997; 33 pages.

* cited by examiner

Algorithm 1 Monitor point selection algorithm procedure *Select_Monitor_Points(P,G)*
    create a bipartite graph $N$ with two sets of nodes for all elements in P and G
    for each flow $p \in P$ do
        for each element $f \in p$ do
            add edge $f \rightarrow p$
        end for
    end for
    Sort element $f \in N$ according to its out degree
    for each element $f \in N$ do
        select $f$ to be a monitor point, remove $p$
        if $p \in N = \emptyset$ then
            break;
        end if
    end for

FIG. 8

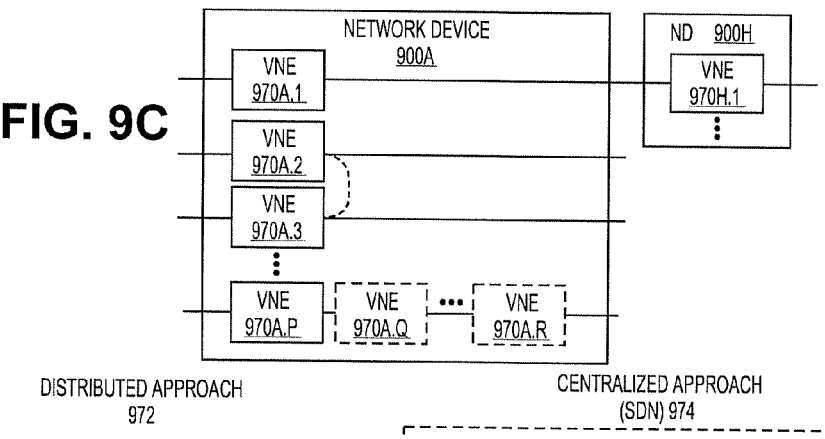
FIG. 9C
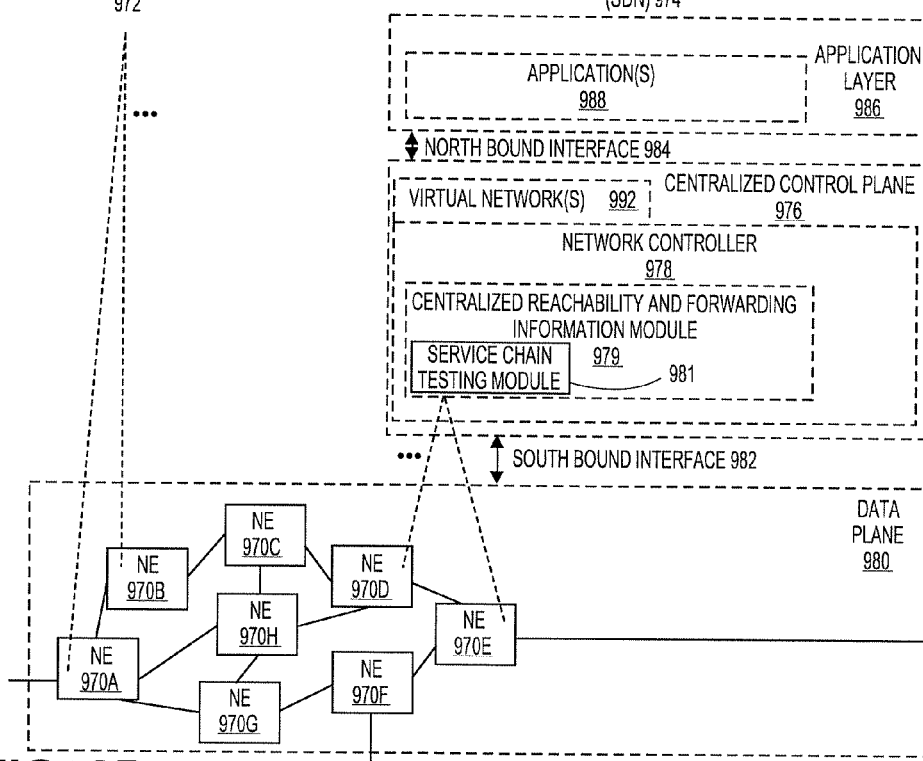
FIG. 9D
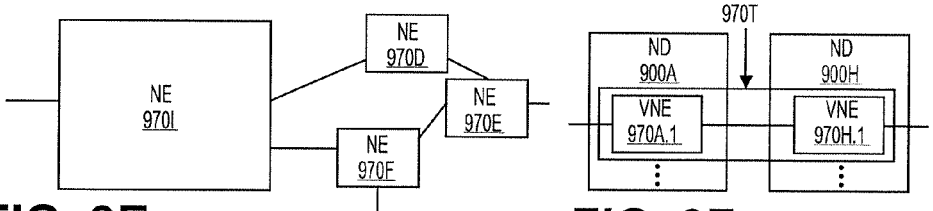
FIG. 9E
FIG. 9F

PASSIVE REACHABILITY MEASUREMENT FOR INLINE SERVICE CHAINING

FIELD

Embodiments of the invention relate to a method and system for path correctness and reachability measurement for inline service chaining More specifically, the embodiments relate to the method and system to configuring the switches of a service chain path to determine path correctness and then to select monitoring points along the path to monitor reachability to detect failures in the service chain.

BACKGROUND

Network operators use different middlebox services or appliances, called inline services, such as Deep Packet Inspection (DPI), logging, metering, charging, advanced charging, Firewall, Intrusion Detection and Prevention (IDP), and Network Address Translation (NAT), to manage subscribers' traffic. These inline services have high requirements on throughput and packet inspection capabilities. The inline services can be transparent or nontransparent to the end users. Inline services can be hosted in dedicated physical hardware, or in virtual machines.

Service chaining is required if the data traffic needs to go through more than one inline service. As used herein service chaining refers to configuring a sequence of inline services that process a particular flow of the data traffic traversing a network administer by a network operator. Moreover, if more than one chain of services is possible, then the network operator needs to configure the networking infrastructure to direct the data traffic associated with a particular flow through the correct inline service path. As used herein, 'traffic steering' refers to directing the forwarding of the data traffic of a flow through an inline service path specified for that data flow. A flow or data flow as used herein refers a set of data that has a common source and destination.

Steering traffic to provide inline service chaining can be implemented using a set of rules or configuration mechanisms to direct the forwarding of the data traffic to each middlebox or similar networking device implementing the inline services. These rules and mechanisms are designed to explicitly insert the inline services on a defined path between the end-points of the path (i.e. the source and destination), or to explicitly route traffic through different middleboxes according to a set of predefined network policies in the controller. However, no matter what mechanisms, rules or policies are used to steer traffic in the network, there exists a problem of how to test that the service path is correctly implemented in the network, and how to verify that a flow traverses the configured path for that flow. For example, it is difficult to verify that a flow 'f' has indeed traversed a set of services A, B, and C in this specific order but no other services. This problem is referred to as reachability measurement for inline service chaining Although there are operations, administration and management (OAM) tools to measure reachability in general networking settings, the inline services chaining imposes new and specific challenges that render these tool ineffective. The key challenge is that, these general OAM tools actively inject packets to the network to test the wellness of a network path. However, if packets are actively injected to the service path, the packets will be forwarded to the middleboxes implementing the inline services. These middleboxes may not know how to handle these OAM injected data packets, and thus, the middleboxes may drop the unknown packets. Or the data packets may confuse the internal states of the middleboxes thereby impacting the performance of these middleboxes and degrading the inline service.

SUMMARY

A method is implemented by a computing device in communication with a network having a plurality of switches. The method performs path correctness testing where the path defines a service chain associated with a flow of data. The method configures the plurality of switches using a flow control protocol. The method includes the steps of selecting a switch from the path to configure path correctness testing, sending a configuration request to the selected switch to instate at least one rule for testing path correctness, receiving copies of flow packets from at least one switch in the path, and comparing the copies of flow packets with a service chain configuration of the flow to confirm path correctness.

A method is implemented by a computing device in communication with a network having a plurality of switches. The method performs path correctness testing where the path defines a service chain associated with a flow of data. The method configures the plurality of switches using a flow control protocol. The method includes the steps of selecting a switch from the path to configure path correctness testing, sending a configuration request to the selected switch to instate at least one rule for testing path correctness, receiving copies of flow packets from at least one switch in the path, and comparing the copies of flow packets with a service chain configuration of the flow to confirm path correctness.

In another embodiment, a control plane device is configured to implement at least one centralized control plane for a software defined network (SDN). The SDN includes a data plane with a plurality of switches. The centralized control plane is configured to execute a method to perform path correctness testing where the path defines a service chain associated with a data flow. The method configures the plurality of switches using a flow control protocol. The control plane device comprises a non-transitory machine-readable storage medium to store an service chain testing module, and a processor communicatively coupled to the non-transitory machine-readable storage medium. The processor is configured to execute the service chain testing module. The service chain testing module is configured to select a switch from the path to configure path correctness testing, to send a configuration request to the selected switch to instate at least one rule for testing path correctness, to receive copies of flow packets from at least one switch in the path, and to compare the copies of flow packets with a service chain configuration of the flow to confirm path correctness.

A computing device implements a plurality of virtual machines for implementing network function virtualization (NFV). The computing device is in communication with a plurality of nodes, wherein a virtual machine from the plurality of virtual machines is configured to execute a method to perform path correctness testing where the path defines a service chain associated with a data flow. The method configures the plurality of nodes using a flow control protocol. The computing device includes a non-transitory machine-readable storage medium to store a service chain testing module, and a processor communicatively coupled to the non-transitory machine-readable storage medium. The processor to execute the virtual machine which is configured to execute the service chain testing module. The service chain testing module is configured to select a switch from the path to configure path correctness testing, to send a configuration request to the selected switch to instate at least one rule for testing path correctness, to receive copies of flow packets from at least one switch in the path, and to compare the copies of flow packets with a service chain configuration of the flow to confirm path correctness.

BRIEF DESCRIPTION OF THE DRAWINGS

The invention may best be understood by referring to the following description and accompanying drawings that are used to illustrate embodiments of the invention. In the drawings:

FIG. 8 is a diagram of one embodiment of pseudo—code for the selection of monitoring points in a network topology.

FIG. 9C illustrates various exemplary ways in which virtual network elements (VNEs) may be coupled according to some embodiments of the invention.

FIG. 9D illustrates a network with a single network element (NE) on each of the NDs of FIG. 9A, and within this straight forward approach contrasts a traditional distributed approach (commonly used by traditional routers) with a centralized approach for maintaining reachability and forwarding information (also called network control), according to some embodiments of the invention.

FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970I in one of the virtual network(s) 992 of FIG. 9D, according to some embodiments of the invention.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention.

DESCRIPTION OF EMBODIMENTS

Figure 1:
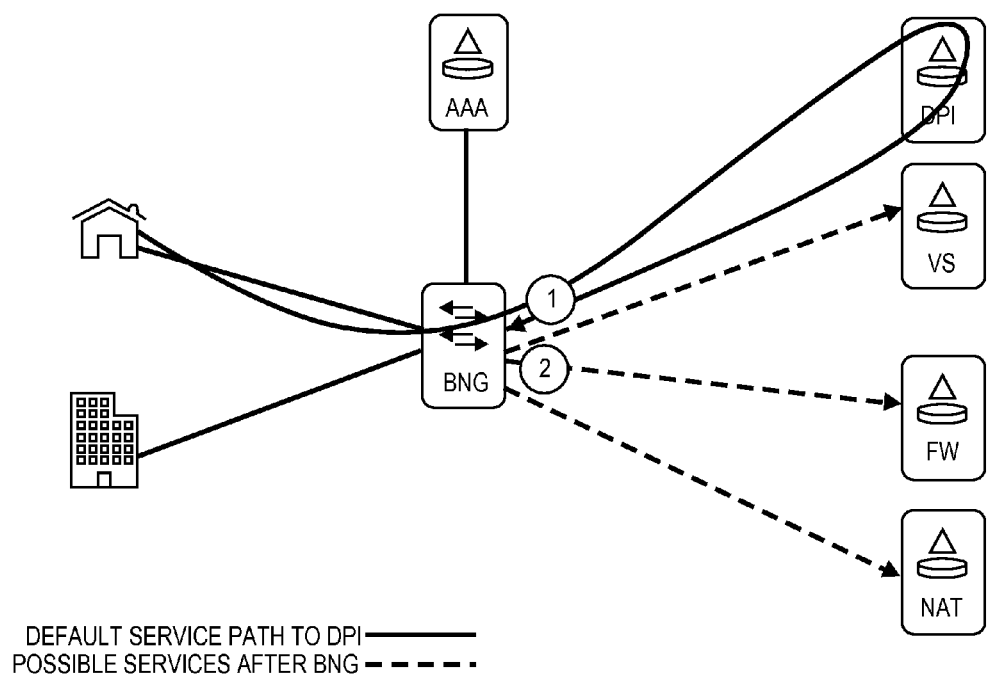
FIG. 1 is a diagram of one embodiment of a network topology where in line services are provided.

The following description describes methods and apparatus for inline service chain path correctness testing and path reachability monitoring, such that one skilled in the art is able to implement appropriate functionality without undue experimentation. The embodiments provide a method and system with a passive measurement approach. By installing rules in the forwarding tables of the relevant switches, each of these switches creates (mirrors) a copy of the first few packets of a data flow to be measured, and forwards it to the controller. By correlating the packets pumped from different switches of the network, the controller can reconstruct the path traversed by the flow, and thus verify the reachability which encompasses testing whether the path is correct and an ongoing monitoring of the reachability of the path. When multiple data flows need to be measured simultaneously, the method and system can include allocation of measurement rules to the switches in an intelligent manner in order to maximize the coverage with minimum number of rules.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Inline Service Chaining

Network operators need some way to perform flexible data traffic steering to properly administer data traffic traversing the networks. Service chaining is required if the traffic needs to go through more than one inline service provided by the network via a middlebox or set of middleboxes. A 'set,' as used herein refers to any positive whole number of items including one item. Moreover, if more than one chain of services is possible, then the network operator needs to configure the networking infrastructure to direct each data traffic flow through the associated inline service path.

To properly implement an inline service chain, the inline service chain must have efficiency, flexibility, scalability, and openness. With regard to efficiency, the data traffic should traverse middleboxes in the sequence specified by the network operators and should not unnecessarily traverse middleboxes that are not specified by the network operators. Significant capital expenditure savings could be achieved if data traffic could be selectively steered through or steered away (bypassed) from specific services and the associated middleboxes.

With regard to flexibility, the inline service framework should support subscriber, application, and network operator specific policies simultaneously. All of these policies may stem from a single control point. Adding or removing new services should be easily done by the network operator. With regard to scalability, the inline service framework should support a large number of rules and scale as the number of subscribers/applications grows. The ability to offer a per-subscriber selection of inline services could potentially lead to the creation of new offerings and hence new ways for operators to monetize their networks.

With regard to openness, the inline service framework should support the deployment of any type of middlebox in the network, independently of its vendor in order to avoid vendor lock-in. Further, network operators should be able to leverage their current investment by reusing their existing middleboxes without modifications. The embodiments provide a solution that meets these requirements of an inline service chain.

Inline service chaining that meets these criteria can be implemented using different techniques and components. In some cases, service chaining can be partly performed by the services themselves, leaving less control to the network operator over the remaining hops in a service path. In this case, the services must be configured to direct traffic to the next hop in the chain if the service box is not directly connected to the next hop. The problem these methods try to solve is depicted in FIG. 1. In this example, it is assumed that data traffic tied to residential subscribers will need DPI and NAT. In this example scenarios, premium residential data traffic will get the same services as basic residential subscribers in addition to firewall and uniform resource locator (URL) filtering (URL filtering is not shown). In the example, enterprise data traffic will not require NAT but will need firewall and virus scanning In this example, all data traffic goes through the DPI and returns to the border network gateway (BNG), point (1) in the figure. From there (point 2 in the figure) the BNG has to direct the data traffic to the right next hop service. The subscriber session authentication, authorization and accounting (AAA) and AAA-driven policy can define the first hop service; however, this subscriber context information is no longer associated with the return traffic from the DPI at point (1). Hence, determining the next service for a specific flow becomes non-trivial.

There are a number of different types of approaches, single boxes running multiple services, statically configured service chains, policy based routing and policy-aware switching layer. Single box running multiple services consolidates all inline services into a single box and hence avoids the need for dealing with inline service chaining configuration of the middleboxes. The network operator adds new services by adding additional service cards to its router or gateway. This approach cannot satisfy the openness requirement as it is hard to integrate existing third party service appliances. This solution also suffers from a scalability issue as the number of services and the aggregated bandwidth is limited by the router's capacity. The number of slots in chassis is also limited.

Statically configured service chains are another approach to configure one or more static service chains where each service is configured to send traffic to the next service in its chain. A router classifies incoming traffic and forwards it to services at the head of each chain based on the result of the classification. However, this approach does not support the definition of policies in a centralized manner and instead requires that each service be configured to classify and steer traffic to the appropriate next service. This approach requires a large amount of service specific configuration and is error prone. Statically configured service chains lack flexibility because they do not support the steering of traffic on a per subscriber basis and limit the different service chains that can be configured. Getting around these limitations requires additional configuration on each service to classify and steer traffic.

A third approach is policy based routing which is based at the router establishing policy based routing (PBR) for each service to be configured to return data traffic back to the router after processing it. The router classifies traffic after each service hop and forwards it to the appropriate service based on the result of the classification. However, it suffers from scalability issues as traffic is forced through the router after every service is performed. The router must be able to handle N times the incoming traffic line rate to support a service chain with N-1 services.

A fourth approach is use of a policy-aware switching layer. A policy-aware switching layer for data centers can be utilized which explicitly forwards data traffic through different sequences of middleboxes to implement service chains. This method satisfies the efficiency requirement but fails to meet the requirements of flexibility and scalability. Each policy needs to be translated into a set of low level forwarding rules on all the relevant switches. There is no explicit way to configure application related and subscriber related rules separately. These types of rules need to be manually consolidated into a set of low level rules. Moreover, this process requires installing one rule for each new data flow. Therefore, it is hard to scale with the number of subscriber and application combinations.

Software Defined Network (SDN) Based Inline Service Chaining

In an SDN, the control plane is decoupled from the forwarding plane and routers are implemented as a distributed system. An SDN contains a network-wide control platform, running on one or more servers in the network, overseeing a set of simple switches. In contrast, traditional router architecture follows an integrated design where the control plane and data forwarding engine are tightly coupled in the same box, which usually results in an overly complicated control plane and complex network management. Due to high complexity, equipment vendors and network operators are reluctant to employ changes and the network itself is fragile and hard to manage. This is known to create a large burden and high barrier to new protocol and technology developments.

The SDN network comprises multiple forwarding elements, i.e., switches interconnecting with each other and a small number of controllers that instruct the switches' forwarding behavior. In an SDN, the main task of a forwarding element, or a switch, is to forward packets from ingress port to an egress port, according to the rules in the flow table programmed by the remote/centralized controller. Each flow entry contains a set of actions such as forwarding packets to a given port, modifying certain bits in the packet header, or encapsulating packets to the controller, or simply dropping the packets. For the first packet in a new flow, the switch normally forwards the packet to the controller to trigger the new flow entry being programmed via a control channel. The control channel can also be used to forward all slow-path packets to the controller for processing such as Internet control message protocol (ICMP) packets. The concept of a flow can be defined broadly, e.g., a transmission control protocol (TCP) connection, or all data traffic from a particular media access control (MAC) address or Internet Protocol (IP) address.

Figure 2:
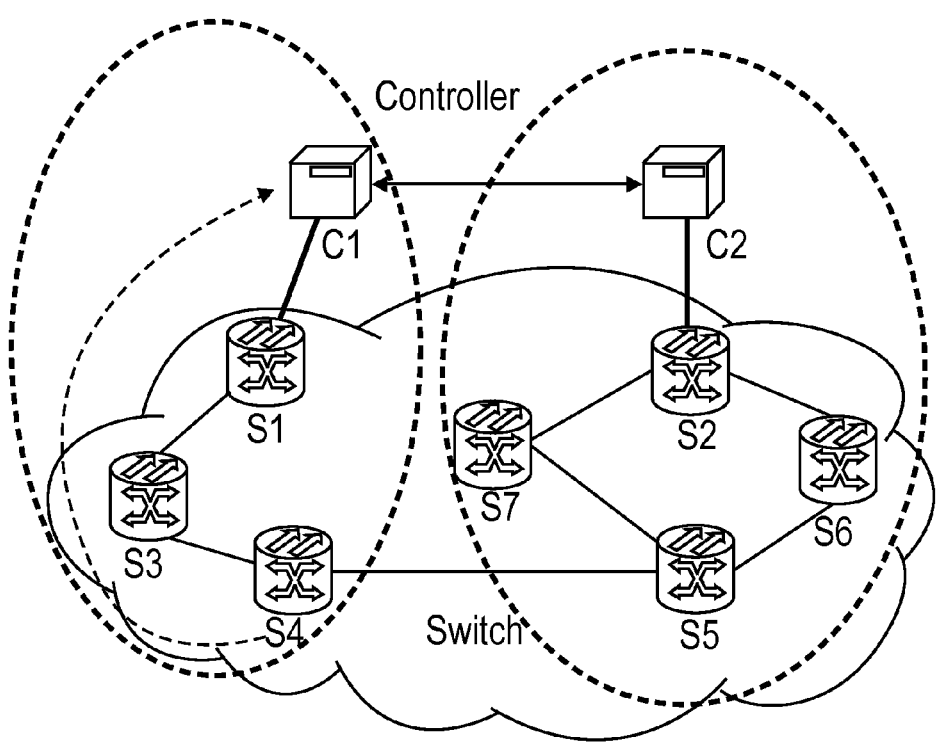
FIG. 2 is a diagram of one embodiment of a network topology for a software defined network.

The central controller of the SDN adds and removes flow-entries from the flow tables of each of the switches in the SDN. The central controller defines the interconnection and routing among the set of data plane switches. The central controller also handles network state distribution, such as collecting information from the switches and distributing routing instructions to them. It can also be programmed to support any new addressing, routing, and complex packet processing applications. The controller is the "brain" of the network. A switch in the SDN needs to be connected to at least one controller to function correctly. A simple network topology that consists of two controllers and a set of switches are illustrated in FIG. 2. In this example, when switch S4 receives a new flow without knowing where to send the packet, S4 forwards the packet to the controller (via the control channels represent as the dashed line). Upon receiving the packet, controller C1 programs a new routing entry on S4.

SDN Based Inline Service Chaining

Figure 3:
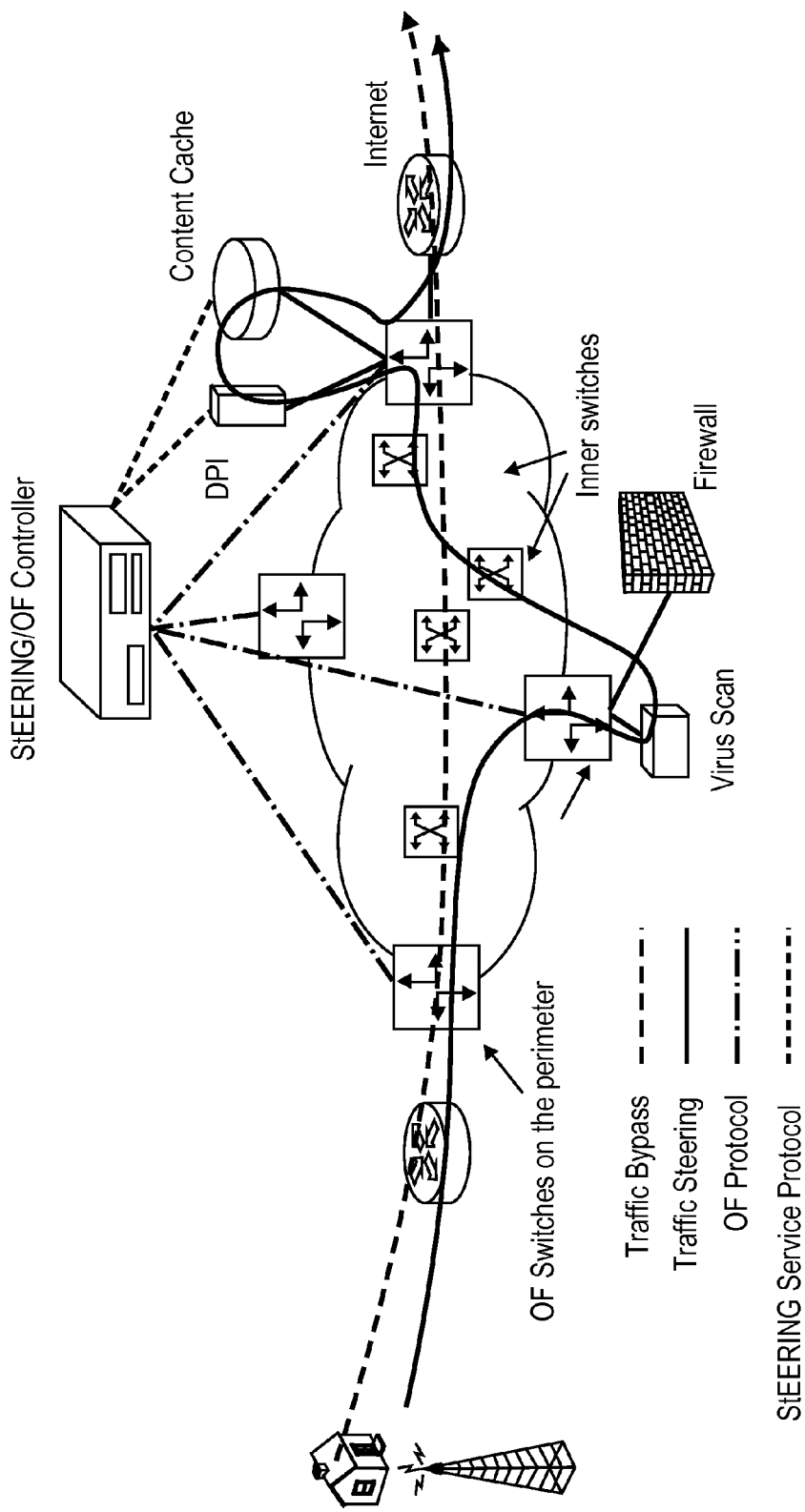
FIG. 3 is a diagram of one embodiment of a network topology illustrating an example of traffic steering with a centralized controller.

FIG. 3 is a diagram of one embodiment of traffic steering in an SDN. The illustrated system uses a logically centralized controller to manage switches and middleboxes. The solid line and the dotted line in FIG. 3 show two different service paths. In this embodiment, service paths are set based on the subscriber, the application, and the required service order. Service paths are unidirectional, that is, different service paths are specified for upstream and downstream traffic. The solid line in this figure shows a service path for the upstream traffic through Virus Scan, DPI and Content Cache. The dotted line shows a service path that bypasses all the services. The SDN based traffic steering architecture uses two different types of switches. The Perimeter Switches are placed on the perimeter of the service delivery network. These switches will classify the incoming data traffic and steer it towards the next service in the chain. These are the switches to which services or gateway nodes are connected. The Inner Switches will forward the traffic through the network. These switches are only connected to other switches. These switches may or may not be controlled by the central controller of the SDN.

Traffic steering in this architecture is a two-step process. The first step classifies incoming packets and assigns them a service path based on predefined subscriber, application, and ordering policies. The second step forwards packets to a next service based on its current position along its assigned service path. This two-step traffic steering process only needs to be performed once between any two border routers, regardless of the number of switches that connects them.

Further in this example of traffic steering, the configuration of switches can be undertaken with any flow control protocol such as the OpenFlow (OF) protocol or similar flow control protocol. The middleboxes and the associated inline services can be configured using any traffic steering protocol to ensure that each service forwards a particular data flow to a next hop in the service chain. Service chains of any length and any number of services can be constructed using this system.

Service Chaining OAM

Regardless of which mechanism is used to implement the service chaining, one important problem is how to verify that the path has correctly installed. The goal is to verify that packets of a given flow have traversed the expected path. Reachability measurement functions include ping and traceroute, which measure the reachability from a source to a destination. Ping triggers ICMP replies and traceroute triggers ICMP time to live (TTL) expiration messages on the routers along the path. Both of these functions do not require two-end control. Ping and traceroute can be utilized at different protocol layers, e.g. multi-protocol label swapping (MPLS) ping.

However, as set forth above, the traditional ping/traceroute functions are not suitable for the inline service setting. In traditional network, the loss of ping/traceroute packets indicates the path problem. However, in an SDN or similar scenario where traffic steering is being utilized for inline service chains, the ping/traceroute packet may not be recognized by the service (i.e. middlebox) in the middle of the path, and thus will get dropped. Thus, the lost measurement packets in this scenario may not be always due to the path reachability problem. Therefore, a different method is needed to measure the path reachability for inline service chaining Overview The embodiments of the invention, overcome the problems of the prior art as set forth above, by providing a method and system to test the reachability of an inline service chain. Instead of actively injecting packets to the network, this method passively observes a data flow at a switch in in the path of the inline service chain, creates a copy of the packets in the data flow, and then forwards the copies to the controller. By correlating the packets captured by different switches, the controller can reconstruct the path traversed by a data flow, and verify the reachability for purposes of patch correctness or general path monitoring.

In some embodiments, the following steps are included in the path monitoring or correctness processes. First, the controller has knowledge of a sequence of middleboxes that each data flow needs to traverse as part of the service chain appropriate for that data flow. The embodiments can be applied regardless of the methods utilized for determining the appropriate service chain and middle boxes for a particular data flow. The controller has knowledge also of the topology of the network and the services, and the constructed service chains for each data flow. Given this set of information as a starting point, the controller receives requests to measure the path for a specific flow. In other words, a request to test path correctness or to monitor the path across the network topology for failure is received. The controller then first installs rules on all the relevant switches to capture the packets. The rules installed in the switches of the path check for matches on the fields of the data packet headers of the data flows received at the input ports of the switch. Where a match is found, then the process creates a copy of the data packet that matches, and sends the copy of the data packet to the controller (while the original of the data packet continues to the next hop in the inline service chain). The fields of the data packets in the data flow can be used to identify the data packets of the particular data flow, and the input port indicates which service the data packets have traversed.

Second, copying (mirroring) all data packets of a data flow to the controller will introduce overhead to the control channel. To reduce the overhead, one of several techniques can be utilized: 1) the controller can issue a command to remove the rule(s) as soon as it receives a significant number of packets, 2) the controller can set a very small timeout value to the rule so that the rule will only be valid for a small amount of time, and 3) the mirrored data packet can be forwarded to a dedicated measurement server connected to the network, instead of being forwarded to the controller. This way, the mirrored packets will not consume the bandwidth of the control channel. In further embodiments, 4) the switches can each maintain a digest of the data packets and only send a summary of the packets to the controller at specific intervals or pre-configured durations.

Third, when multiple data flows need to be measured at the same time, and the switches only have a limited amount of rule space for the path monitoring and correctness processes, an algorithm can be employed to best allocate the rules to the switches, in order to maximize the measurement coverage for continuous monitoring.

In some embodiments, the usage of the processes can be further described as follows. The method can be used to monitor both the full service chain and monitor the well-being of each individual service and each individual switch within the chain. In one example, the method can be used as a three-step process. First, after the service chain is installed, an administrator can direct the controller or the controller can automatically utilize the path testing and monitoring process to test that the data flows associated with an installed service chain have traversed each service correctly. Second, the method can be utilized to continuously monitor the entire service chain as a whole. Third, when a problem is detected from the end-to-end monitoring in step two, the process can add more monitor points to monitor individual service in order to further narrow down the problem.

Figure 4:
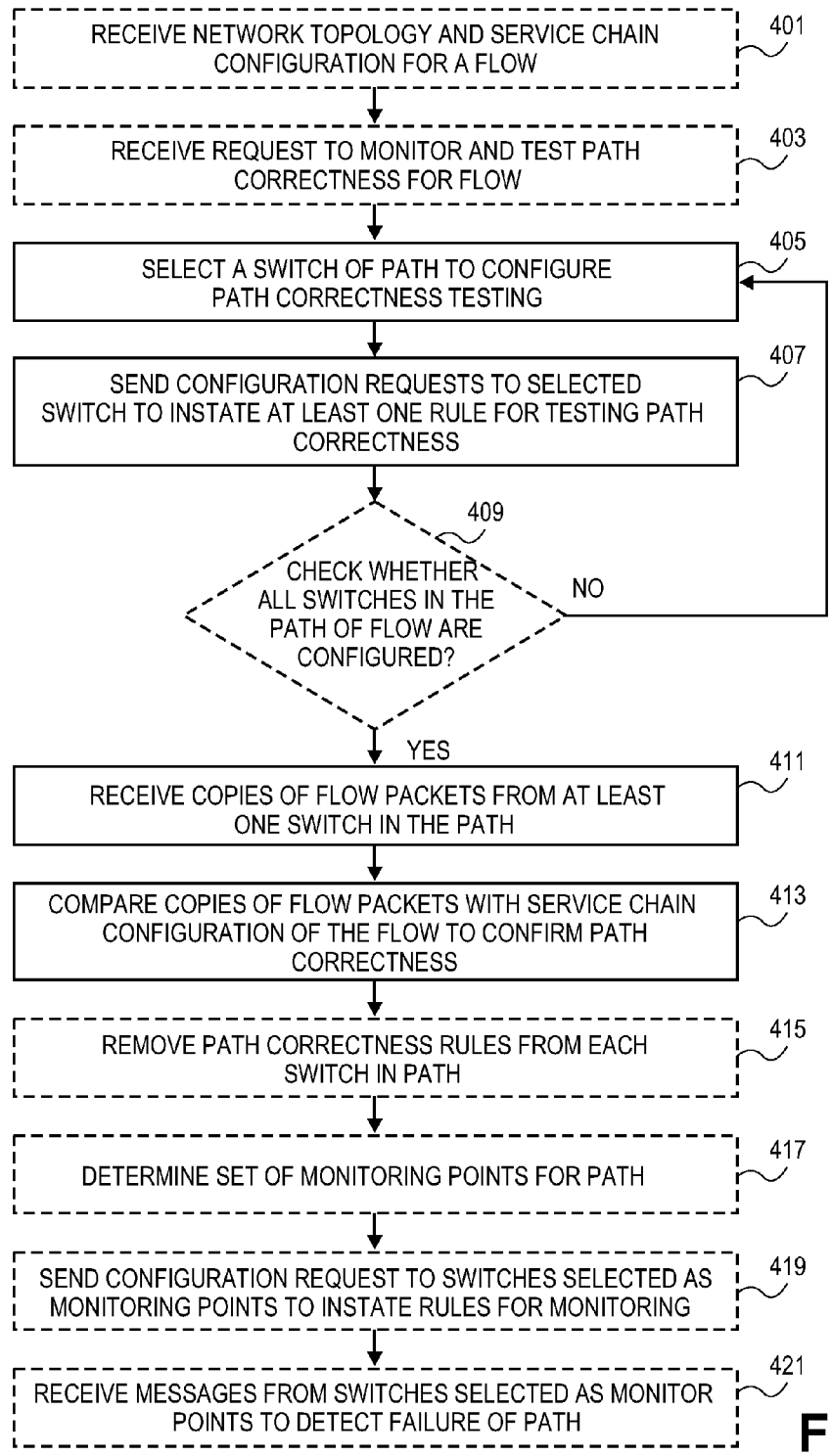
FIG. 4 is a flowchart of one embodiment of a process for path correctness and reachability monitoring.

FIG. 4 is a flowchart of one embodiment of the overall process. In one embodiment, the process is initiated in response to the controller determining or receiving a network topology and service chain configuration (Block 401). The network topology can be determined by any network discovery protocol or combination of such protocols and administrator input. The service chain configuration is for at least one data flow or set of data flows. Any number of service chains for any combination of data flows can be defined and configured. These service chains can be explicitly defined by a network administrator or can be defined by a set of policies related to a set of subscribers, sources or similar data flow identification. Given the network topology and the service chain configuration for at least one data flow, the controller can receive a request to implement a service chain monitoring (i.e. reachability) process and/or a service chain path testing process (Block 403).

The request can be processed by selecting a first switch from the path to configure for path correctness testing (Block 405). The order of path selection can be in any priority or utilize any algorithm or a parallel processing of the switches can be implemented. For sake of clarity an iterative process is described herein for processing the switches. For a selected switch the controller sends a configuration message or request to instate a set of rules for testing the path correctness (Block 407). As discussed further herein below, the instated rules set up a mirroring of data flow traffic to the controller to enable the controller to recreate the path of the data traffic as it traverses the inline service chain. As a basic set of rules, the switch is configured to recognize data packets for the given data flow and to make a copy of the data packet. One copy is sent toward the next hop in the service chain while the other copy is sent to the controller for analysis. As each switch is configured with the rules, the controller checks whether all of the switches of the path for the given flow have been configured (Block 409). The process continues to configure each switch (Block 405) until all of the switches are configured.

Once all of the switches are configured, the copies of the data packets will start to be received at the controller over the control channel from each of the configured switches as the data packets are passed along the inline service chain (Block 411). The controller will compare the received copies of the data packets from each of the data flows with the service chain configuration for that data flow to confirm that the path correctness (Block 413). The controller will identify the associated service chain and data flow for each data packet by examination of its metadata or similar information. A check will then be made to determine if the data packet is being received from one of the configured switches along the path of the inline service chain and if the data packet is being received from the switches in the correct order of the inline service path. If the data packets are sent from the correct switches and in the correct order, then the path is verified as correct and the process can proceed to a path monitoring process. If the data packets do not properly correspond to the configured inline service path, then the process may generate an alert for a network administrator and/or initiate an automated process to attempt to reconfigure, retest or similarly repair the inline service path (not shown). For sake of clarity and conciseness, the example embodiment of the process assumes that path correctness is tested before monitoring is initiated. However, one skilled in the art would understand that these processes can be implemented independently in other embodiments.

If the path was tested and found correct, then the process may then remove the instated rules for the path testing for each switch (Block 415). The path rules can be removed as part of an iterative process, in parallel or using any priority or algorithm. The process then determines a set of monitoring points for the inline service path (Block 417). Example algorithms for determining the set of monitoring points are discussed herein below in greater detail. Any process or algorithm can be utilized to identify a set of switches along the path that are optimal for monitoring the reachability of the switches and thereby determine that the path is functioning properly. Once the monitoring points are identified and configured, then the controller (or in some embodiments a dedicated monitoring server or similar platform) begins to receive messages from the monitoring points. The messages can be copies of the data packets or can be accounting of the data packets or similar meta data that are collected as the data packets travers the monitoring points such that the controller can determine whether the path is functioning as expected and that data traffic is reaching its designated middleboxes and services in the network.

Figure 5:
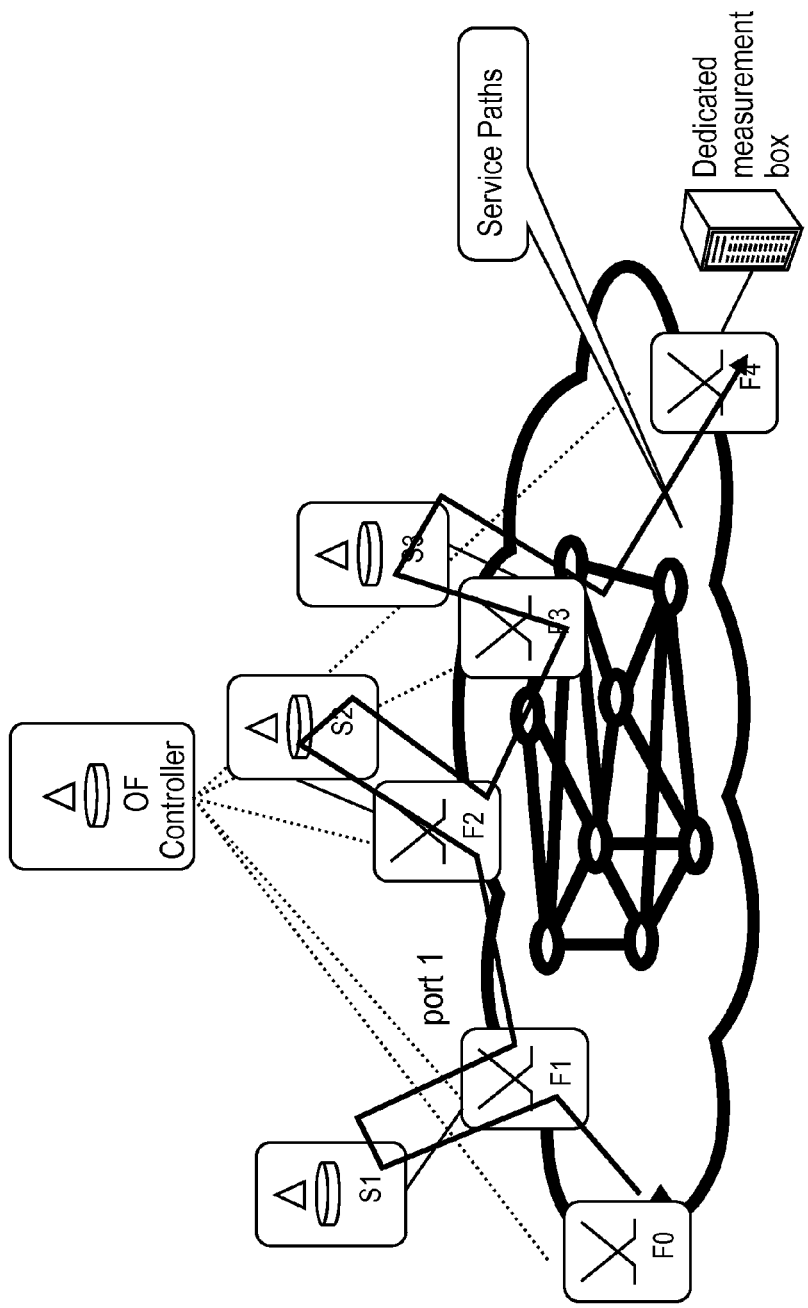
FIG. 5 is a diagram of one example embodiment of a network topology with service chaining and traffic steering including a dedicated measure box.

FIG. 5 is a diagram of a network topology for presenting an example application of the processes described herein above and the general reachability problem for inline service chaining The reachability problem of inline service chaining is discussed herein below with reference to an example application. Assuming that a data flow f traverses service chain (S1, S2, S3) in order, the network topology is shown in FIG. 5. In this example, the services are connected to switches F1, F2, F3, respectively. The flow enters from the ingress switch F0 and exits the network from egress switch F4. The goal is to test that flow f has traversed the path (F0-F1-S1-F1-F2-S2-F2-F3-S3-F3-F4). The reachability problem implies three dimensions: 1) if the service path is set up correctly, then the traffic traverses service S1, S2, S3 in this order; 2) there is no failure at the forwarding path, i.e. switches F0-F4 function correctly to forward the packets, and 3) there is no failure in the services, i.e. services S1-S3 are alive and send/receive data packets of the flow f correctly. If these three items are checked then it implies that the services S1-S3 perform the correct actions/functions on the data packets of flow f. That is, the process does not directly test whether the services are functioning correctly, since determining correct functioning depends on the service logic and the knowledge of the service, which is too computationally intensive for ongoing monitoring.

Figure 6:
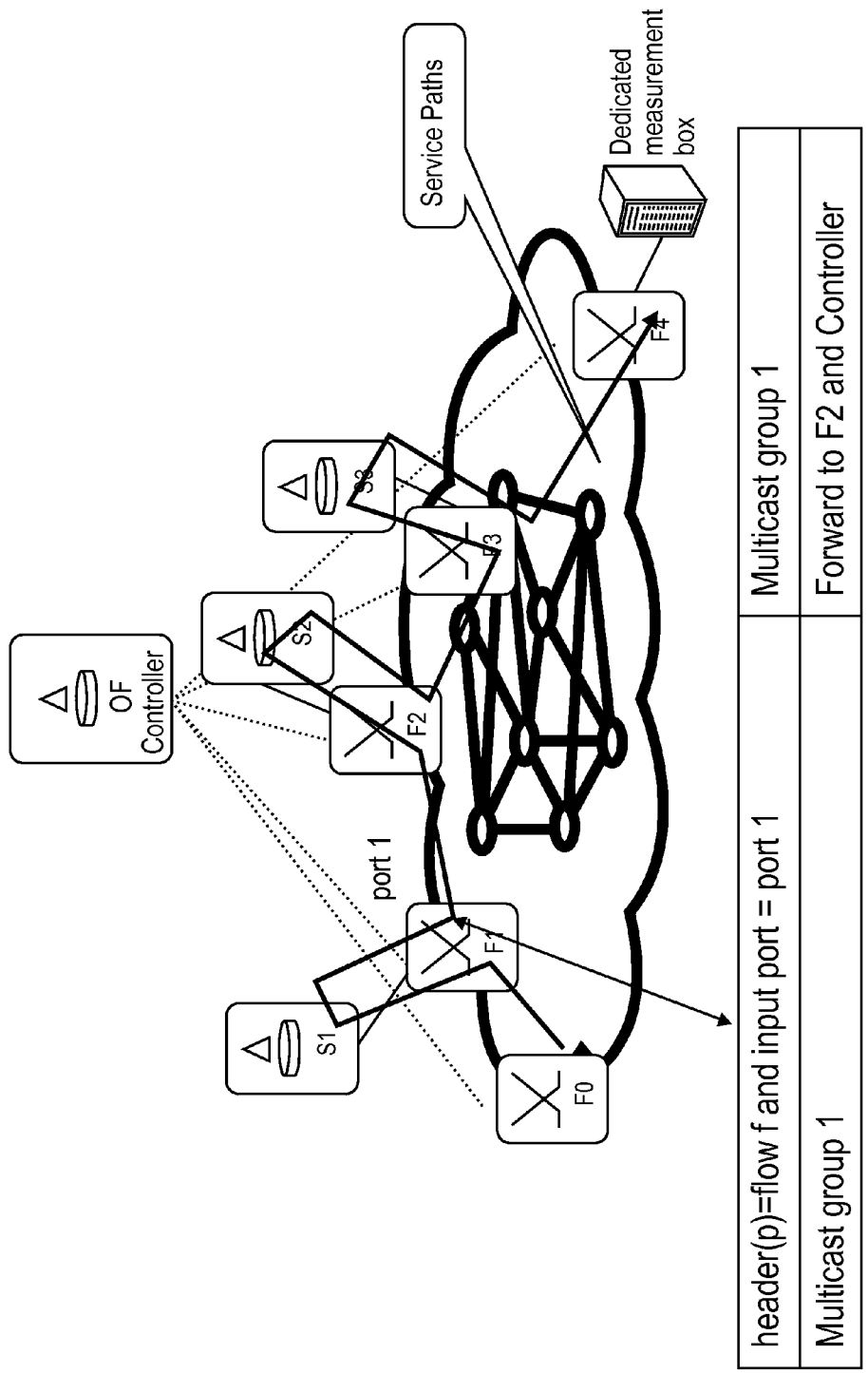
FIG. 6 is a diagram of one example embodiment of a network topology with service chaining and traffic steering including a dedicated measure box.

Next, an example of one embodiment of a solution in detailed using the same example. A key idea is to have the controller install flow control (e.g., OpenFlow (OF)) rules on the switches to create a mirror of packets for data flow f. FIG. 6 shows the rules to be installed on switch F1, F2, and F3 for the purpose of testing reachability. In particular, on F1, we install a rule 1) If (header of data packet p matches designated fields of data flow f) and (input port=port number connected to service S1), then forward the data packet to a multicast group 1. The process then instates a rule to handle multicast group 1. The second rule 2) is if the data packet belongs to (multicast group 1), then forward the data packet to F2 and the controller. Here the process uses a multicast group to realize the creation of a copy of a packet and to send it to the controller. When the controller receives the packets from F, knowing the network topology, the controller will know that these packets have traversed service S1. These two rules can be referred to as the mirroring rules herein below. Similarly, if the process installs the rules on F2 and F3, then the controller can know whether data flow f has traversed services S2 and S3.

However, this basic design has a scalability problem; it may overload the link between the controller and the switch. The embodiments encompass several alternatives to alleviate this problem: 1) One option is to limit the number of mirrored packets with existing flow control protocol (e.g., Openflow) capabilities. Existing flow control protocols such as OpenFlow may only support a limited number of actions on the switches. Thus, if a process only uses existing Openflow capabilities, then the controller needs to make the duration of mirroring packets as short as possible to reduce the number of mirrored packets. To do this, the controller can issue a deletion of the rule t seconds later than the mirroring rules installation, where t is a very small number. Another alternative is to set the timeout value of the mirroring rules to be a very small value. Both approaches assume the mirroring rules are installed after the flow starts.

2) A second option is to limit the number of mirrored packets with new capabilities or additional functions for a control flow protocol. If a process is not limited to the existing flow control protocol, e.g., Openflow, capabilities, then the switch can perform some actions, e.g. delete/modify a rule upon some counter values. For example, for rule 2, we can add a counter c to the total number of packets sent to this multicast group 1. The switch can be added with another rule: If the counter c>Threshold T, delete rule 2. Then it is possible to limit the number of packets sent to the controller to be the first T packets of the flow.

3) A third option is to forward the packets to a dedicated measurement server. Another way to reduce the load on the control channel is to have a dedicated data store for receiving the packet copies. It can be a dedicated measurement server connected to one of the switches in the network, as is shown in FIG. 5. It should be noted that some services may discard packets as a part of their functions, for example, firewalls to stop flows, rate limiters to drop packets, which may require more careful interpretation to the monitoring results. In some embodiments, the monitoring system analysis module or similar component of a service chain testing module can be aware of the functional logic of each service and take this into consideration when interpreting the results. Similarly, it is possible that some services modify the data packet header fields, such as NAT. If the controller can accurately know the modification, it can create a mapping of the data flows before and after a service and still capture the data packets for the same data flow. If not, then the controller can use a combination of data packet headers and payloads as the key to capture data packets.

In summary, as described above in regard to FIG. 4 and the example set forth above, the overall process works as follows; first the service chain is installed. A controller, such as an SDN controller, or similar centralized controller installs the rules to set up the forwarding for the inline service path for a specific flow. The network topology is assumed to also be known to the controller. Second, the test of path correctness is carried out. The controller installs the mirroring rules on the corresponding switches to test that the data flow is correctly routed through the path. This requires mirroring packets after each service in the service chain. Third and finally, continuous monitoring of reachability is implemented. After testing the path's correctness, the process can continuously monitor in order to detect any failure of forwarding path and/or the failure of services. From the previous step, the process already knows that the service chain is implemented correctly. So in this step, the process does not need to test all the services along the inline service chain; instead, we can selectively monitor a few points in the chain. With multiple chains, we can select the monitoring points intelligently to jointly detect the problem. Next, it is discussed in further detail how to do the continuous monitoring with the multiple chains.

Continuous Monitoring Process

Figure 7:
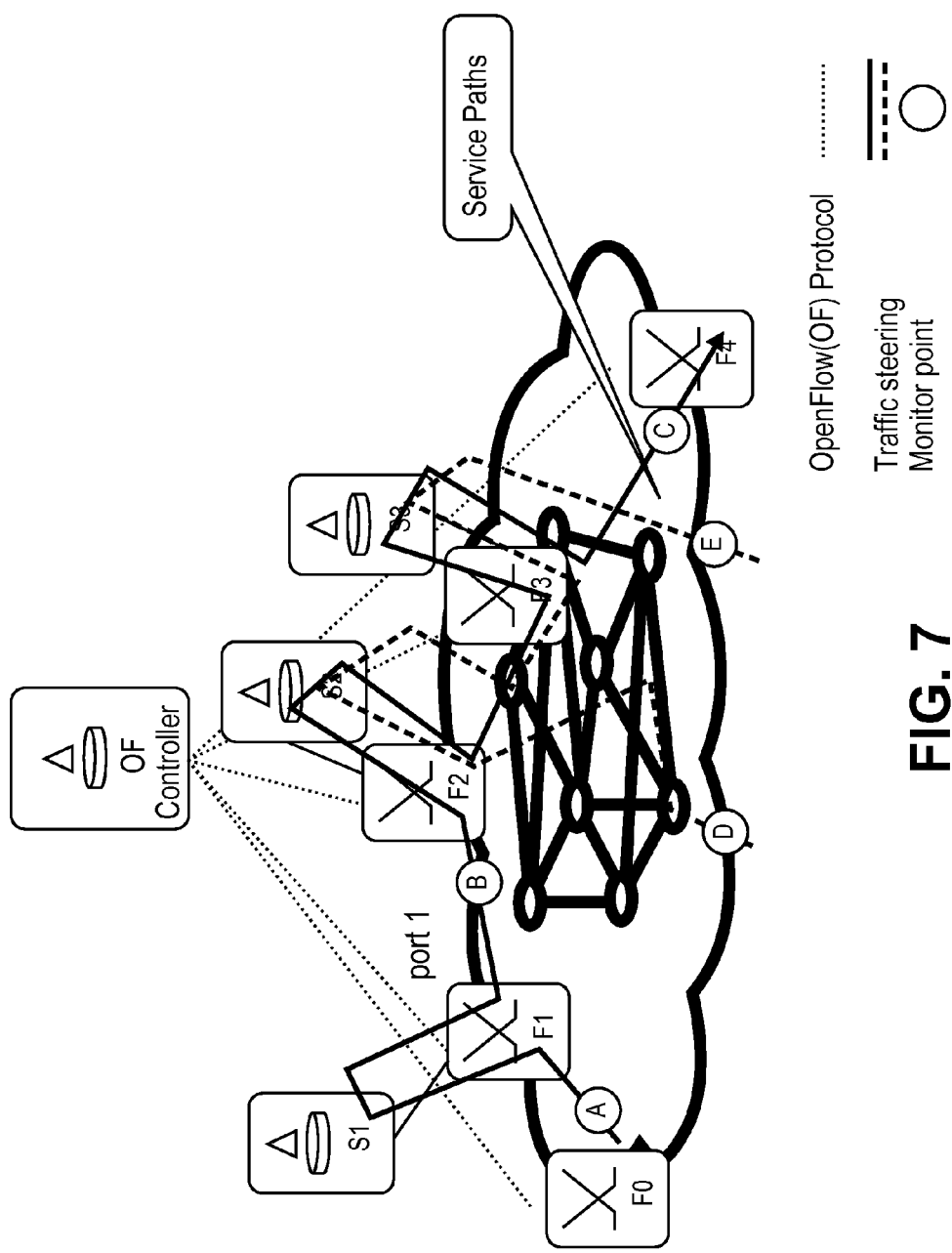
FIG. 7 is a diagram of one example embodiment of a network topology with service chaining and traffic steering including a dedicated measure box and monitoring points.

In the second step outlined in the summary above, it was tested that the inline service chain has been implemented correctly. In the third step and also as discussed with regard to FIG. 4, the process begins to continuously monitor the inline service chain to make sure there is no failure in any component of the network. A key idea is that in this step, the process does not need to monitor data traffic after every service in the inline service chain as had been done in the second step. Instead, because the path has already been tested, the process can monitor a small number of points in the service chain, or even just monitor the two ends of a service chain. For example, as shown in FIG. 7, there are two service chains, one represented by a solid line and the other being the dotted line one.

It is possible to define a monitor point to be the point where the process installs mirroring rules. FIG. 7 shows a set of example monitor points in circles. With monitor points of A and B, we can ensure if there is any failure in any of the services or switches in this part of chain segment. Thus, given this set of monitor points A-E, if any failure occurs in service S1, we can detect a reachability failure from monitor point B. If any failure occurs in service S2 and S3, we will detect it from both monitor C and monitor E. If we observe that both C and E are affected, but B is not affected, then it suggests likely that either S2 or S3, or any of forwarding elements along this path segment fails. This example shows that the paths for multiple service chains may overlap, and we can select a subset of the points in the path to monitor, in order to reduce the load for continuous monitoring.

Using FIG. 7 and the illustrated topology as an example, the problem is defined as follows; an inline service chain 'p' is defined as a sequence of forwarding switches and the services, for example, p0={F0,F1,S1,F2,S2,F3,S3,F4}, p1={F1,F2,S2,F3,S3,Fj}, etc. Given multiple inline service chains where P is the set of service chains, P={p0,p1, . . . pk}, the process needs to select a minimum number of monitor points so that all the path segments are covered. A key idea is to create a bipartite graph by mapping each possible monitoring point candidate (i.e., switches in the network topology) to the inline service chain or specific service that the monitoring point can cover. Then the monitoring points are sorted according to the out degree (the number of services or inline service chains it can monitor). In one embodiment, the process greedily selects the monitor points until all the services of each inline service chain are covered. The detailed algorithm is shown in FIG. 8. This example monitoring point selection algorithm is provided by way of example and not limitation, those skilled in the art would understand that any selection algorithm can be used in conjunction with the path monitoring process described herein above.

Thus, the embodiments discussed herein provide a method for monitoring reachability for inline service chaining It can be used for both testing the implementation of the service chain after it is installed, and for continuous monitoring during run time. The embodiments can be utilized with any type or size of network, together with any traffic steering mechanism, to reduce the monitoring overhead in the network.

Figures 9A, 9B:
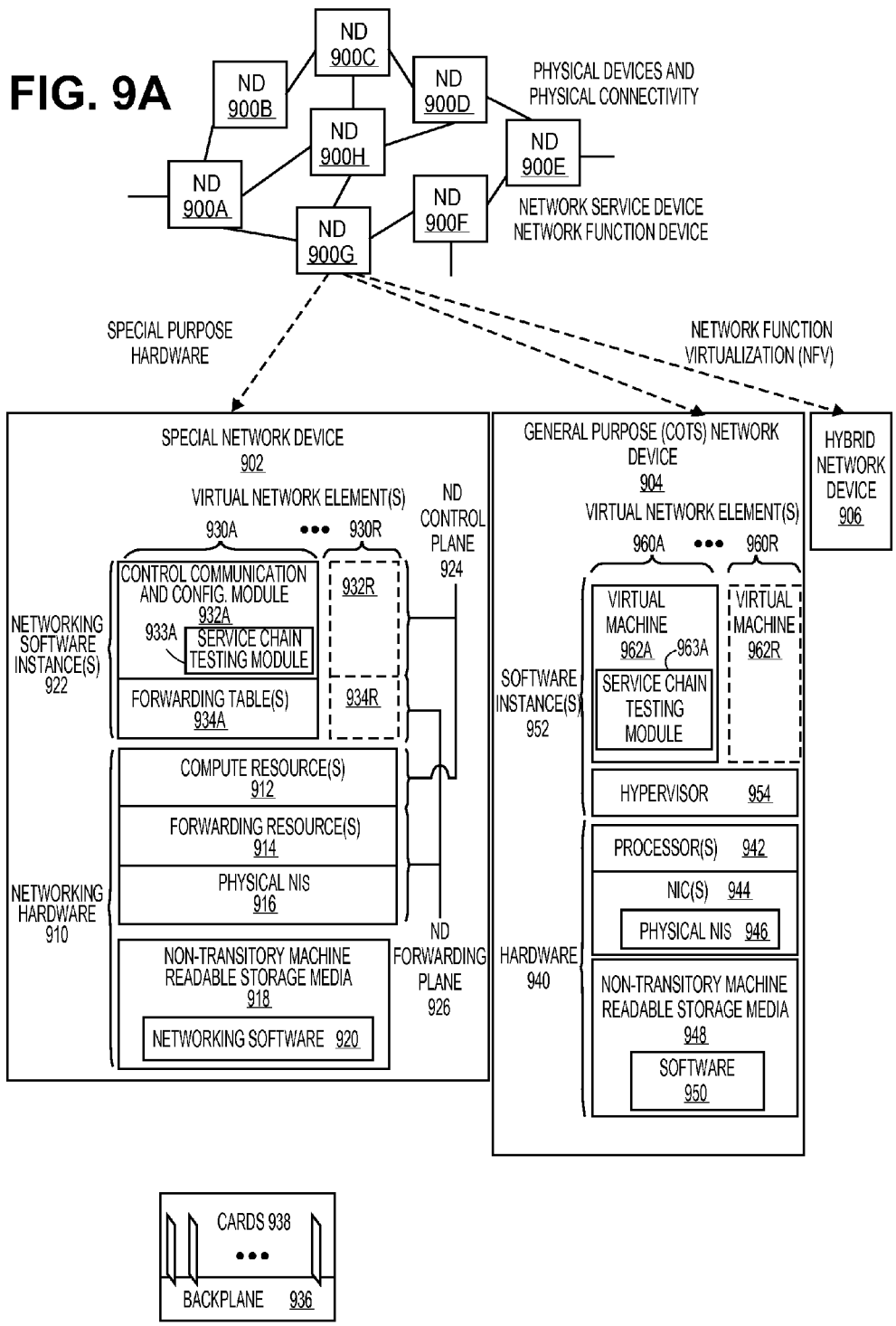
FIG. 9A illustrates connectivity between network devices (NDs) within an exemplary network, as well as three exemplary implementations of the NDs, according to some embodiments of the invention.
FIG. 9B illustrates an exemplary way to implement the special-purpose network device 902 according to some embodiments of the invention.
Figure 10:
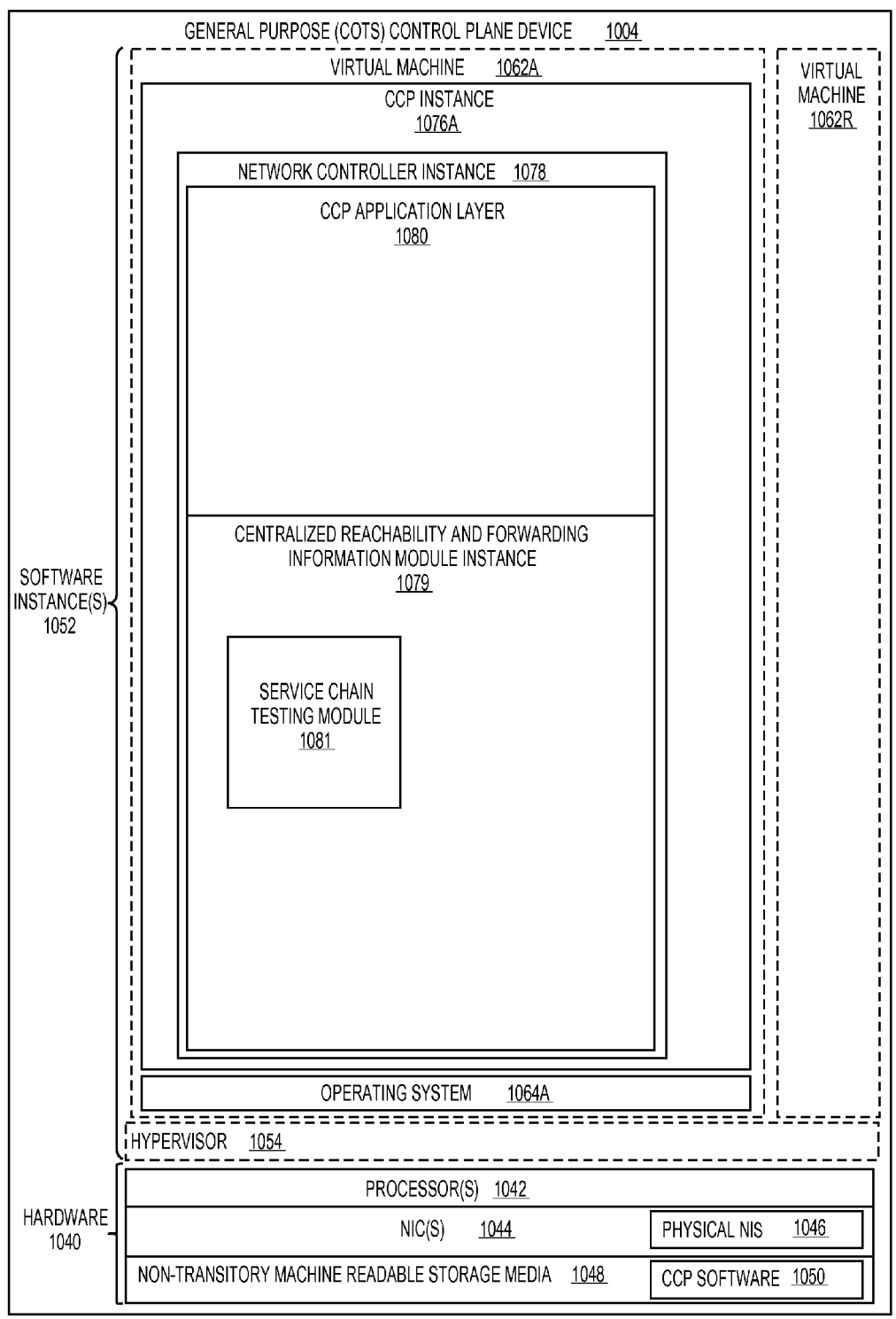
FIG. 10 illustrates a general purpose control plane device 1004 including hardware 940 comprising a set of one or more processor(s) 942 (which are often Commercial off-the-shelf (COTS) processors) and network interface controller(s) 944 (NICs; also known as network interface cards) (which include physical NIs 946), as well as non-transitory machine readable storage media 948 having stored therein centralized control plane (CCP) software 950), according to some embodiments of the invention.

FIGS. 9A-10 are diagrams of various embodiments of a network devices, computing devices, and networks implementing the reachability monitoring process including the inline service chain path correctness testing and monitoring.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The inline service chain monitoring and path correctness testing can be implemented as modules in any combination of software, including firmware, and hardware within the router. The functions of the process that are executed and implemented by the NDs include those described further herein above. In various embodiments, the functions are implemented by a processor that executes a service chain testing module.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). The service chain testing module 933A implements the processes described herein above including LFA computation as part of the Control communication and Configuration Module 932A or similar aspect of the networking software, which may be loaded and stored in the non-transitory machine readable media 918 or in a similar location.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate a hypervisor 954 (sometimes referred to as a virtual machine monitor (VMM)) and one or more virtual machines 962A-R that are run by the hypervisor 954, which are collectively referred to as software instance(s) 952. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 962A-R, and that part of the hardware 940 that executes that virtual machine (be it hardware dedicated to that virtual machine and/or time slices of hardware temporally shared by that virtual machine with others of the virtual machine(s) 962A-R), forms a separate virtual network element(s) 960A-R. In one embodiment, the virtual machines 932A-R may execute the described service chain testing module 963A and related software described herein above.

The virtual network element(s) 960A-R perform similar functionality to the virtual network element(s) 930A-R. For instance, the hypervisor 954 may present a virtual operating platform that appears like networking hardware 910 to virtual machine 962A, and the virtual machine 962A may be used to implement functionality similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 962A-R differently. For example, while embodiments of the invention are illustrated with each virtual machine 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 954 includes a virtual switch that provides similar forwarding services as a physical Ethernet switch. Specifically, this virtual switch forwards traffic between virtual machines and the NIC(s) 944, as well as optionally between the virtual machines 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the virtual machines 962A-R may operate as servers; the same would be true for the hybrid network device 906; in the case of the special-purpose network device 902, one or more such servers could also be run on a hypervisor executed by the compute resource(s) 912; in which case the servers are said to be co-located with the VNEs of that ND.

A virtual network is a logical abstraction of a physical network (such as that in FIG. 9A) that provides network services (e.g., L2 and/or L3services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. In one embodiment, the centralized reachability and forwarding information module 979 may include the service chain testing module 981 and related software as described herein above.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970I in one of the virtual network(s) 992 of FIG. 9D, according to some embodiments of the invention. FIG. 9E shows that in this virtual network, the NE 970I is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a hypervisor 1054 (sometimes referred to as a virtual machine monitor (VMM)) and one or more virtual machines 1062A-R that are run by the hypervisor 1054; which are collectively referred to as software instance(s) 1052. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 1050 (illustrated as CCP instance 1076A) on top of an operating system 1064A are typically executed within the virtual machine 1062A. In embodiments where compute virtualization is not used, the CCP instance 1076A on top of operating system 1064A is executed on the "bare metal" general purpose control plane device 1004.

The operating system 1064A provides basic processing, input/output (I/O), and networking capabilities. In some embodiments, the CCP instance 1076A includes a network controller instance 1078. The network controller instance 1078 includes a centralized reachability and forwarding information module instance 1079 (which is a middleware layer providing the context of the network controller 1078 to the operating system 1064A and communicating with the various NEs), and an CCP application layer 1080 (sometimes referred to as an application layer) over the middleware layer (providing the intelligence required for various network operations such as protocols, network situational awareness, and user-interfaces). In one embodiment, the centralized reachability and forwarding information module 1079 may include the service chain testing module 1081 and related software as described herein above.

At a more abstract level, this CCP application layer 1080 within the centralized control plane 1076 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a computing device in communication with a network having a plurality of switches, the method to perform path correctness testing where the path defines a service chain associated with a flow of data, the method to configure the plurality of switches using a flow control protocol, the method comprising the steps of:
    selecting a switch from the path to configure path correctness testing;
    sending a configuration request to the selected switch to instate at least one rule for testing path correctness;
    receiving copies of flow packets from at least one switch in the path; and
    comparing the copies of flow packets with a service chain configuration of the flow to confirm path correctness.

2. The method of claim 1, further comprising the steps of:
    receiving network topology and the service chain configuration for the flow; and
    receiving a request to test path correctness for the service chain of the flow.

3. The method of claim 1, further comprising the step of:
    checking whether all switches in the path of the flow are configured for path correctness testing.

4. The method of claim 1, further comprising the step of:
    removing the path correctness rules from each switch of the path after confirming path correctness.

5. The method of claim 1, further comprising the step of:
    determining a set of monitoring points for the path.

6. The method of claim 1, further comprising the step of:
    sending configuration requests to each switch selected as a monitoring point to instate rules for monitoring.

7. The method of claim 1, further comprising the step of:
    receiving messages from switches selected as monitoring points to detect path failure.

8. A control plane device configured to implement at least one centralized control plane for a software defined network (SDN), the SDN including a data plane with a plurality of switches, the centralized control plane configured to execute a method to perform path correctness testing where the path defines a service chain associated with a data flow, the method to configure the plurality of switches using a flow control protocol, the control plane device comprising:
    a non-transitory machine-readable storage medium to store an service chain testing module; and
    a processor communicatively coupled to the non-transitory machine-readable storage medium, the processor to execute the service chain testing module, the service chain testing module configured to select a switch from the path to configure path correctness testing, to send a configuration request to the selected switch to instate at least one rule for testing path correctness, to receive copies of flow packets from at least one switch in the path, and to compare the copies of flow packets with a service chain configuration of the flow to confirm path correctness.

9. The control plane device of claim 8, wherein the processor is further configured to execute the service chain testing module to receive network topology and the service chain configuration for the flow, and to receive a request to test path correctness for the service chain of the flow.

10. The control plane device of claim 8, wherein the processor is further configured to execute the service chain testing module to check whether all switches in the path of the flow are configured for path correctness testing.

11. The control plane device of claim 8, wherein the processor is further configured to execute the service chain testing module to remove the path correctness rules from each switch of the path after confirming path correctness.

12. The control plane device of claim 8, wherein the processor is further configured to execute the service chain testing module to determine a set of monitoring points for the path.

13. The control plane device of claim 8, wherein the processor is further configured to execute the service chain testing module to send configuration requests to each switch selected as a monitoring point to instate rules for monitoring.

14. The control plane device of claim 8, wherein the processor is further configured to execute the service chain testing module to receive messages from switches selected as monitoring points to detect path failure.

15. A computing device implementing a plurality of virtual machines for implementing network function virtualization (NFV), the computing device in communication with a plurality of nodes, wherein a virtual machine from the plurality of virtual machines is configured to execute a method to perform path correctness testing where the path defines a service chain associated with a data flow, the method to configure the plurality of nodes using a flow control protocol, the computing device comprising:
    a non-transitory machine-readable storage medium to store an service chain testing module; and
    a processor communicatively coupled to the non-transitory machine-readable storage medium, the processor to execute the virtual machine which is configured to execute the service chain testing module, the service chain testing module configured to select a switch from the path to configure path correctness testing, to send a configuration request to the selected switch to instate at least one rule for testing path correctness, to receive copies of flow packets from at least one switch in the path, and to compare the copies of flow packets with a service chain configuration of the flow to confirm path correctness.

16. The computing device of claim 15, wherein the processor is further configured to execute the service chain testing module to receive network topology and the service chain configuration for the flow, and to receive a request to test path correctness for the service chain of the flow.

17. The computing device of claim 15, wherein the processor is further configured to execute the service chain testing module to check whether all switches in the path of the flow are configured for path correctness testing.

18. The computing device of claim 15, wherein the processor is further configured to execute the service chain testing module to remove the path correctness rules from each switch of the path after confirming path correctness.

19. The computing device of claim 15, wherein the processor is further configured to execute the service chain testing module to determine a set of monitoring points for the path.

20. The computing device of claim 15, wherein the processor is further configured to execute the service chain testing module to send configuration requests to each switch selected as a monitoring point to instate rules for monitoring.

21. The computing device of claim 15, wherein the processor is further configured to execute the service chain testing module to receive messages from switches selected as monitoring points to detect path failure.

\* \* \* \* \*